United States Patent
Hasegawa et al.

(10) Patent No.: US 7,575,271 B2
(45) Date of Patent: Aug. 18, 2009

(54) PEDESTRIAN PROTECTION APPARATUS FOR VEHICLE

(75) Inventors: Kuniaki Hasegawa, Kariya (JP); Masanobu Fukukawa, Toyota (JP); Yoshihiro Ogura, Toyota (JP); Keisuke Noyori, Toyota (JP); Hiroki Kurokawa, Toyota (JP)

(73) Assignee: Kojima Press Industry Co., Ltd., Toyota-Shi (JP)

( * ) Notice: Subject to any disclaimer, the term of this patent is extended or adjusted under 35 U.S.C. 154(b) by 11 days.

(21) Appl. No.: 11/760,920

(22) Filed: Jun. 11, 2007

(65) Prior Publication Data

US 2007/0284915 A1  Dec. 13, 2007

(30) Foreign Application Priority Data

Jun. 13, 2006 (JP) ............................. 2006-163174

(51) Int. Cl.
*B60R 19/18* (2006.01)

(52) U.S. Cl. ................................. 296/187.04; 293/121

(58) Field of Classification Search ................... 293/15, 293/120, 121; 296/187.04
See application file for complete search history.

(56) References Cited

U.S. PATENT DOCUMENTS

| | | | |
|---|---|---|---|
| 6,428,065 B2 | 8/2002 | Sato et al. | |
| 6,540,275 B1 * | 4/2003 | Iwamoto et al. | 293/24 |
| 6,755,459 B2 * | 6/2004 | Thelen et al. | 296/187.04 |
| 6,877,785 B2 * | 4/2005 | Evans et al. | 293/120 |
| 6,893,064 B2 | 5/2005 | Satou | |
| 7,114,587 B2 | 10/2006 | Mori et al. | |
| 7,325,861 B2 * | 2/2008 | Zacheiss et al. | 296/187.09 |
| 2008/0093868 A1 * | 4/2008 | Steller | 293/142 |

FOREIGN PATENT DOCUMENTS

| | | |
|---|---|---|
| EP | 1 726 490 | 11/2006 |
| JP | 2001-277963 A1 | 10/2001 |
| JP | 2002-264741 A1 | 9/2002 |
| JP | 2003-306047 A1 | 10/2003 |
| JP | 2004-025976 A1 | 1/2004 |
| JP | 2004-203183 A1 | 7/2004 |
| JP | 2006-327438 | 12/2006 |

* cited by examiner

*Primary Examiner*—Dennis H Pedder
(74) *Attorney, Agent, or Firm*—Burr & Brown

(57) ABSTRACT

A pedestrian protection apparatus for a vehicle, includes a plate member which is disposed at a lower part of a front of the vehicle so as to extend in a frontward and backward direction of the vehicle, which includes a front portion and a rear portion; and a plurality of first reinforcing beads protruding upward and extending in the frontward and backward direction of the vehicle and a plurality of second reinforcing beads protruding downward and extending in the frontward and backward direction. The first reinforcing beads and the second reinforcing beads are provided integrally with the front portion so as to be alternately disposed in a vehicle width direction. The apparatus is arranged to sweep a leg portion that has collided with the front of the vehicle by contact of the plate member with the leg portion, thereby protecting the leg portion.

9 Claims, 7 Drawing Sheets

PEDESTRIAN PROTECTION APPARATUS FOR VEHICLE

The present application is based on Japanese Patent Application No. 2006-163174 filed on Jun. 13, 2006, the contents of which are incorporated herein by reference.

BACKGROUND OF THE INVENTION

1. Field of the Invention

The present invention relates in general to a pedestrian protection apparatus for a vehicle, more particularly, to an improved structure of the pedestrian protection apparatus installed at a lower part of a front face of the vehicle and arranged to sweep a lower parts of the leg portion that has collided with or came into contact with the front face of the vehicle, thereby protecting the leg portion of the pedestrian.

2. Discussion of Related Art

Various types of protection apparatuses are conventionally installed at a front, a rear, or side faces of the vehicles such as automotive vehicles, mainly in order to absorb an impact energy generated upon a collision, for thereby protecting the bodies of the vehicles and vehicle passengers. In recent years, apparatuses for protecting pedestrians have been installed at the front of vehicle to protect the pedestrian when the front of the vehicle collides with or comes into contact with the pedestrian.

As one type of a pedestrian protection apparatus, there is known a so-called leg-sweep apparatus. The leg-sweep apparatus is installed inside of a front bumper or at a lower part of the front bumper independently of the front bumper. The leg-sweep apparatus is arranged to apply a counterforce with respect to an impact load, which is inputted upon a collision of the pedestrian with the front face of the vehicle, to the lower part of the leg portion of the pedestrian so that the lower part of the leg portion is swept (scooped up) and the pedestrian falls down toward the vehicle. Thus, it is possible to minimize the occurrence of injuries such as a bone fracture of the leg portion, thereby assuring protection and safety of the pedestrian.

For example, a patent publication document 1 (JP-A-2001-277963) discloses a leg-sweep apparatus which is arranged to be disposed at the lower part of the front of a vehicle and includes; a resin foam body which extends in a width direction of the vehicle such that at least a part thereof protrudes from the front face of the vehicle, and a beam which extends in the width direction of the vehicle while being in contact with the back side of the resin foam body. A patent publication document 2 (JP-A-2004-25976) discloses a leg-sweep apparatus that is formed of, for example, a metal pipe, and that is fixed to the lower part of the front of a vehicle such as to extend in the width direction of the vehicle. Further, a patent publication document 3 (JP-A-2004-203183) discloses a leg-sweep apparatus which includes; a plate member which extends in the frontward and backward direction of a vehicle and fixed to the lower part of the front of the vehicle; and a plurality of flat ribs disposed on a front portion of the plate member so as to extend upright therefrom, so that the front portion of the plate member has an increased rigidity. Further, a rear portion of the plate member has a flat plate-like configuration extending in the frontward and backward direction of the vehicle. The thus constructed apparatus is fixed to the vehicle at a rear-side end section of the rear portion of the plate member. However, the leg-sweep apparatus disclosed in the above publications have backwards disadvantages which should be rectified.

That is, the pedestrian protection apparatus disclosed in the patent publication document 1 needs a large number of components. For this reason, the component cost is inevitably high, and it is cumbersome to install the apparatus on the vehicle. The pedestrian protection apparatus disclosed in the patent publication document 2 inevitably has a large weight, and it is difficult to form the apparatus in a shape that conforms to the shape of the front face of the vehicle.

The pedestrian protection apparatus disclosed in the patent publication document 3 ensures a sufficiently reduced weight where the plate member and the plurality of ribs are formed integrally with each other using a synthetic resin material, for instance. Moreover, a higher formability and a smaller number of components can be advantageously achieved by employing, in formation of the plate member and the plurality of ribs, a molding technique using metal dies such as injection molding. This effectively eliminated the disadvantages of the pedestrian protection apparatuses disclosed in a patent publication document 1 and 2. However, further enhancement of the impact performance is hindered by some obstacles described below.

Namely, in the pedestrian protection apparatus disclosed in the patent publication document 3, an impact load in the load characteristic is promptly increased and reaches a target value quickly when the apparatus contacts with the leg portion of a pedestrian, thus ensuring high impact performance that permits a high degree of sufficient counterforce with respect to the impact load to be instantaneously exhibited. To this end, it is necessary to increase the height of the ribs provided in the front portion of the plate member, to which the impact load is inputted, so that the front portion has a sufficient rigidity, for thereby preventing the front portion from being easily deformed. In this case, however, even when the apparatus is constituted by a resin-molded product, the total weight of the pedestrian protection apparatus is increased by the increase in height of the ribs, and the merit of resin-molded product, i.e. lightness is considerably deteriorated. Further, where the height of the each rib is increased, it is required to form sufficiently deep recesses in a molding die for forming each rib having increase height. Therefore, it takes additional time to form the metal mold, and release characteristics of the molded component may be deteriorated. In consequence, there may be caused a problem of deterioration in manufacturing efficiency of the entire pedestrian protection apparatus.

Under the situations mentioned above, a patent publication document 4 (JP-A-2002-264741) discloses a pedestrian protection apparatus in which, instead of the flat ribs, a plurality of reinforcing beads are provided integrally on a front portion of a plate member. Each reinforcing bead extends in the frontward and backward direction of the vehicle with an angular U-shaped cross section or channel-like configuration in the vehicle width direction that is open downward. With this configuration, while the protrusion heights of the reinforcing beads are relatively small, the front portion of the plate member can have a rigidity that is equivalent to the rigidity obtained when the high flat ribs are formed integrally on the front portion of the plate member. Accordingly, the disadvantages of the pedestrian protection apparatuses disclosed in the patent publication documents 1 and 2 can be eliminated, and furthermore, the problem of the pedestrian protection apparatus disclosed in the patent publication document 3 can be eliminated.

However, as the result of various tests and investigations, the inventors of the present invention found that the pedestrian protection apparatus disclosed in the patent publication document 4 had following problems. That is, in this apparatus, since all the angular U-shaped reinforcing beads protrude upward from the front portion of the plate member, there is a difference in rigidity between an upper side and a lower side of the plate member. Therefore, a force for lifting up the plate member inevitably acts on the front portion of the plate member upon inputting of the impact load. The rear portion of the flat plate member is relatively easily bent so that the front portion of the plate member is curled up. As a result, the rise of the impact load in the load characteristic is delayed, and the impact load cannot instantaneously reach the target value. In consequence, the high rigidity is ensured in the front portion of the plate member, but the pedestrian protection apparatus disclosed in the patent publication document 4 does not ensure satisfactory impact performance that permits a sufficiently high degree of counterforce with respect to the impact load to be instantaneously exhibited.

When the pedestrian protection apparatus disclosed in the patent publication document 4 is installed on the lower part of the vehicle, the rear ends of the reinforcing beads are in contact with a cross member of the vehicle. Therefore, when an impact load is inputted, a counterforce thereto can be effectively obtained from the cross member via the reinforcing beads. However, when an impact load is not generated by a collision with the pedestrian, but is generated by, for example, a low-speed collision, a so-called light collision, with a solid structure such as a wall, a heavy impact load is inputted to the cross member via the reinforcing beads. Thereby, the cross member is damaged heavily. As a result, even if the collision is light, high repair cost is required. This was also found by the inventors of the present invention.

SUMMARY OF THE INVENTION

The present invention has been made in view of the above-described circumstances. It is therefore an object of the invention is to provide an improved pedestrian protection apparatus for a vehicle that effectively ensures excellent impact performance that permits a sufficient high degree of counterforce with respect to an impact load to be instantaneously exhibited, and that prevents a vehicle from being unnecessarily damaged by a portion of the apparatus fixed to the vehicle even in the occurrence of a light collision.

The above-indicated object of the invention may be attained according to a principle of the invention, which provides a pedestrian protection apparatus for a vehicle, comprising a plate member which is disposed at a lower part of a front of the vehicle so as to extend in a frontward and backward direction of the vehicle, which includes a front portion and a rear portion, the apparatus being arranged to sweep a leg portion of a pedestrian that has collided with the front of the vehicle by contact of a front end of the plate member with the leg portion of the pedestrian, thereby protecting the leg portion of the pedestrian, wherein the front portion of the plate member includes a plurality of first reinforcing beads each protruding upward and extending in the frontward and backward direction of the vehicle and a plurality of second reinforcing beads each protruding downward and extending in the frontward and backward direction of the vehicle, the plurality of first reinforcing beads and the plurality of second reinforcing beads being provided integrally with the front portion so as to be alternately disposed in a width direction of the vehicle, and wherein the rear portion of the plate member has a flat section extending in the frontward and backward direction of the vehicle and which is fixed at a rear end to the vehicle.

In the pedestrian protection apparatus according to the present invention, a plurality of reinforcing beads are provided integrally on the front portion of the plate member such as to extend in the frontward and backward direction of the vehicle. Therefore, unlike the above-described known apparatus in which a plurality of flat ribs are provided on the front portion of the plate member, the rigidity of the front portion of the plate member can be advantageously increased without deterioration in manufacturing efficiency of the apparatus.

The reinforcing beads for increasing the rigidity of the front portion of the plate member are constituted by a plurality of first reinforcing beads protruding upward and a plurality of second reinforcing beads protruding downward. Therefore, the difference in rigidity between the upper and lower sides of the plate member can be prevented or minimized. According to the arrangement, there is generated no force that lift the front portion upward or downward upon inputting of the impact load thereto, thereby effectively preventing the flat portion formed by the rear portion of the plate member from being bent easily. As a result, the impact load in the load characteristics can rise promptly and reach a target value quickly, thereby a sufficient counterforce with respect to the impact load can be generated instantaneously.

The pedestrian protection apparatus is fixed to the vehicle at the rear end of the flat portion formed by the rear portion of the plate member extending in the frontward and backward direction of the vehicle. The flat portion does not include a reinforcing bead. Therefore, unlike the known apparatus in which the rear ends of the reinforcing beads are in contact with the cross member of the vehicle, for example, when a light collision occurs, an impact load can be advantageously prevented from being directly inputted from the reinforcing beads to the cross member and to a component of the vehicle to which the plate member is fixed.

Accordingly, it is possible to effectively obtain excellent impact performance that permits a sufficient counterforce to be instantaneously exhibited with respect to an impact load, and it is also possible to effectively prevent the vehicle from being unnecessarily damaged by the portion of the apparatus fixed to the vehicle even in the occurrence of a light collision. As a result, when the front of the vehicle collides with the leg portion of the pedestrian, the leg portion is quickly and reliably swept, thereby assuring sufficient protection of pedestrian with higher reliability. Moreover, the cost of repairing the damage caused by the light collision can be minimized.

Forms of the Invention

The present invention is preferably practiced in at least the following forms:

(1) A pedestrian protection apparatus for a vehicle, comprising a plate member which is disposed at a lower part of a front of the vehicle so as to extend in a frontward and backward direction of the vehicle, which includes a front portion and a rear portion, the apparatus being arranged to sweep a leg portion of a pedestrian that has collided with the front of the vehicle by contact of a front end of the plate member with the leg portion of the pedestrian, thereby protecting the leg portion of the pedestrian, wherein the front portion of the plate member includes a plurality of first reinforcing beads each protruding upward and extending in the frontward and backward direction of the vehicle and a plurality of second reinforcing beads each protruding downward and extending in the frontward and backward direction of the vehicle, the plurality of first reinforcing beads and the plurality of second reinforcing beads being provided integrally with the front portion so as to be alternately disposed in a width direction of the vehicle, and wherein the rear portion of the plate member has a flat section extending in the frontward and backward direction of the vehicle and which is fixed at a rear end to the vehicle.

(2) The pedestrian protection apparatus according to the above form (1), wherein a protrusion height of the plurality of first reinforcing beads from an upper surface of the plate member is substantially equal to a protrusion height of the plurality of second reinforcing beads from a lower surface of the plate member. According to this form, the difference in rigidity between the upper and lower sides of the plate member can be more effectively prevented or reduced, and the rear portion of the plate member is more advantageously prevented from being easily bent such that the front portion of the plate member is curled up or lifted down upon inputting of the impact load. Accordingly, the impact load in the load characteristics effectively and promptly rises, and excellent impact performance that can instantaneously generate a sufficient counterforce with respect to the impact load is obtained more reliably. Herein, the phrase "substantially equal" mentioned in the present specification is not strictly limited to a state of the heights that the first and second reinforcing beads are exactly equal. The phrase includes a state of heights that is slightly different, but regarded substantially equal. Hereinafter, this phrase will be used in the meaning described above.

(3) The pedestrian protection apparatus according to the above form (1) or (2), wherein the plurality of first reinforcing beads has an angular U-shaped cross section which is taken along a plane perpendicular to the frontward and backward direction of the vehicle and which is open downward, and the plurality of second reinforcing beads each of which has an angular U-shaped cross section which is taken along a plane perpendicular to the frontward and backward direction of the vehicle and which is open upward. According to this form, sufficiently strong reinforcing beads can be easily formed with excellent formability.

(4) The pedestrian protection apparatus according to any one of the above forms (1) to (3), wherein each of the plurality of first reinforcing beads and each of the plurality of second reinforcing beads further includes, at a forward end thereof, a forward vertical wall which has a front surface extending in a vertical direction and which constitutes at least a part of the front end of the plate member. According to this form, an impact load generated by a collision of the leg portion of the pedestrian is inputted substantially perpendicularly to the forward wall which constitutes at least a part of the front end of the plate member. According to the arrangement, there is generated no force that lift the front portion upward or downward upon inputting of the impact load thereto. In this case, the impact load in the load characteristics also rises promptly and reaches a target value quickly, thereby ensuring excellent impact performance that enables a sufficient counterforce to be exhibited instantaneously with respect to the impact load.

BRIEF DESCRIPTION OF THE DRAWINGS

The above and other objects, features (forms), advantages and technical and industrial significance of the present invention will be better understood by reading the following detailed description of presently preferred embodiments of the invention, when considered in connection with the accompanying drawings, in which.

DETAIL DESCRIPTION OF THE INVENTION

To further clarify the present invention, there will be described in detail embodiments of invention with reference to the accompanying drawings.

Figure 1:
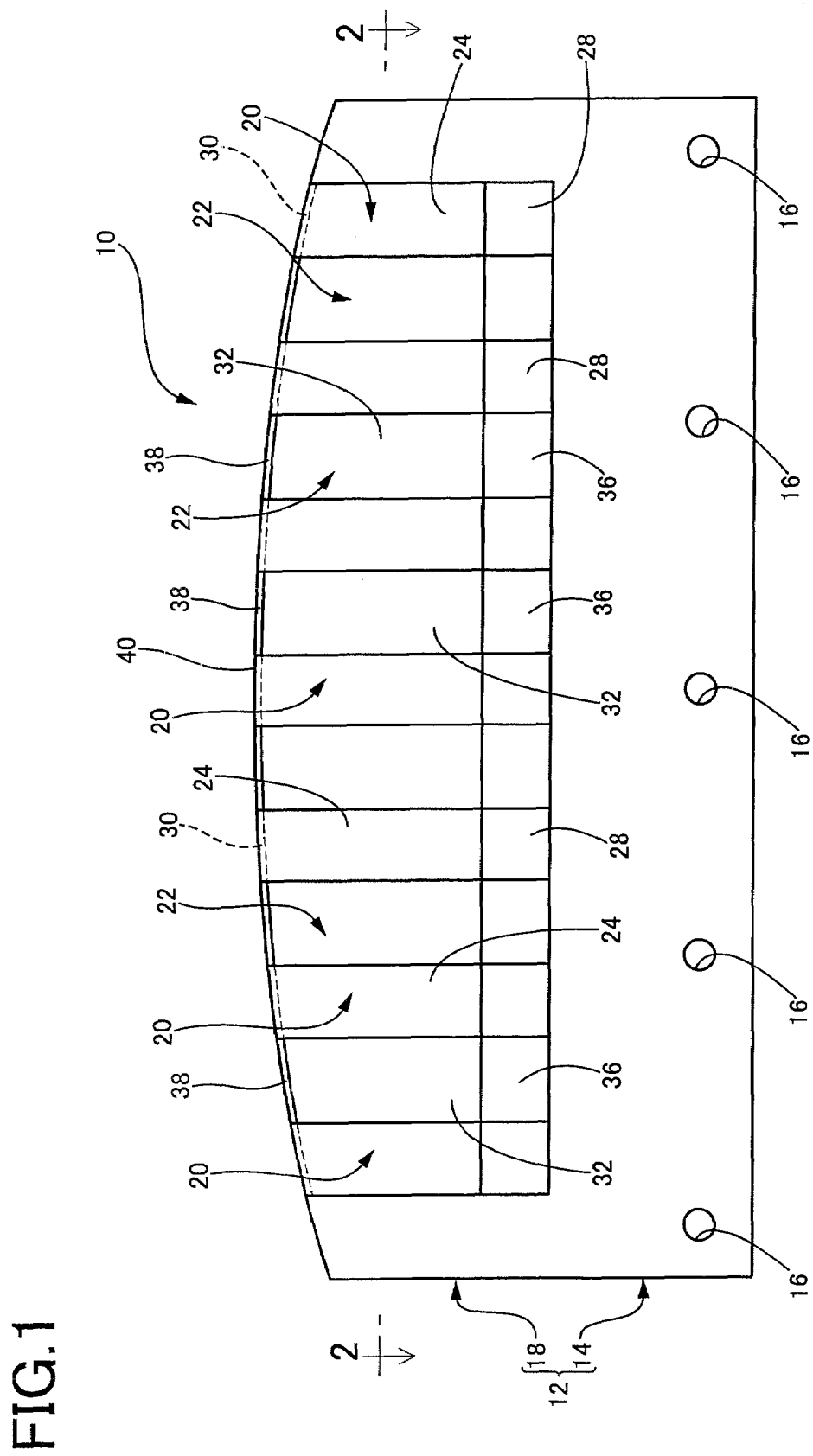
FIG. 1 is an explanatory top plan view of a pedestrian protection apparatus constructed according to an embodiment of the present invention.
Figure 2:
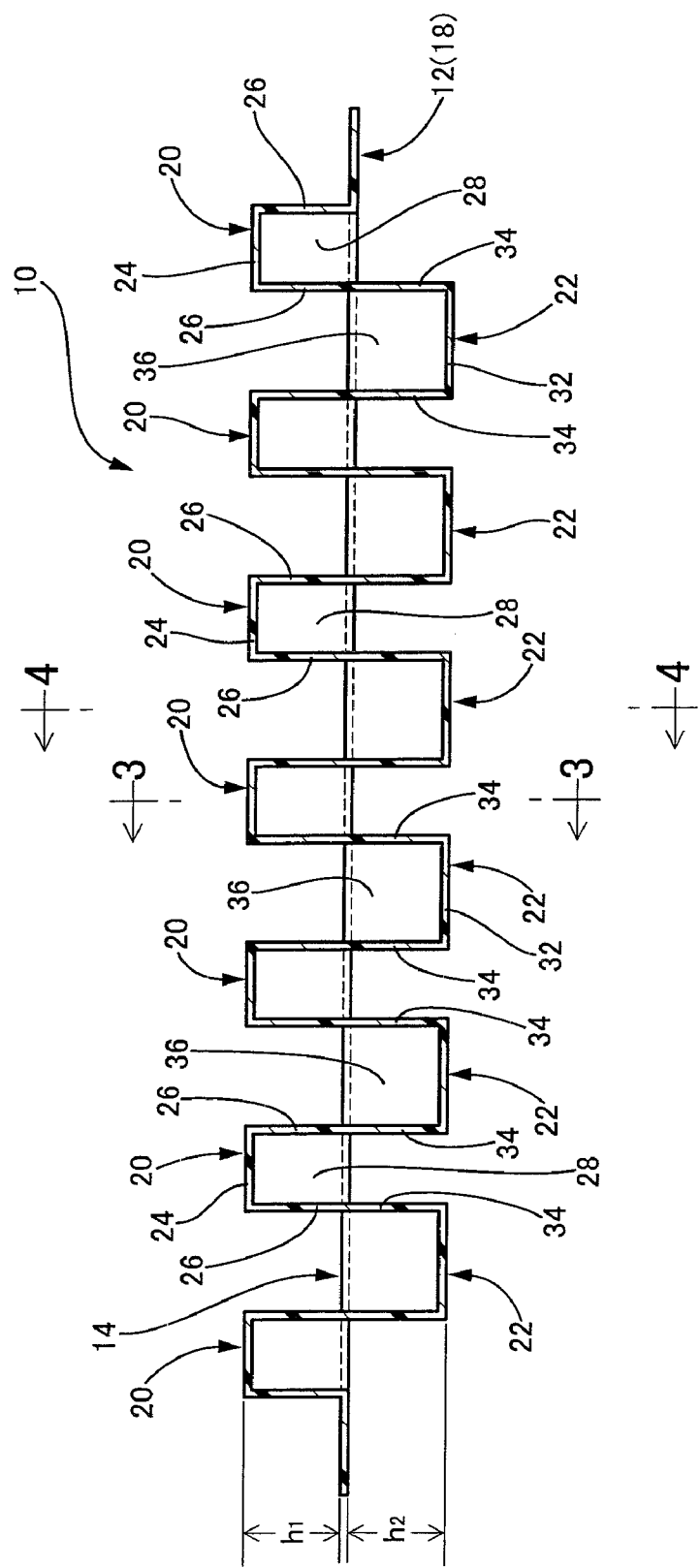
FIG. 2 is an explanatory cross sectional view taken along line 2-2 of FIG. 1.

FIGS. 1 and 2 are a top plan view and a cross-sectional view, respectively, schematically showing a leg-sweep apparatus 10 serving as a pedestrian protection apparatus constructed according to an embodiment of the present invention. This leg-sweep apparatus 10 is installed inside of a front bumper provided at the front face of a vehicle. As apparent from FIGS. 1 and 2, the present leg-sweep apparatus 10 includes a base plate 12 as a plate member.

The base plate 12 is made of, for example, a synthetic resin material such as polypropylene or ABS resin and is constituted by a thin planer plate having a generally elongated-rectangular shape. A dimension of the base plate 12 as measured in the leftward and rightward direction in FIG. 1, which corresponds to the width or lateral direction of the vehicle under the installation of the leg-sweep apparatus 10 on the vehicle (hereinafter referred to as "the leftward and rightward direction"), is made smaller than the width of the vehicle by a predetermined amount, and a dimension as measured in the upward and downward direction in FIG. 1, which corresponds to the frontward and backward direction of the vehicle (hereinafter referred to as "the frontward and backward direction"), is made sufficiently smaller than the dimension in the leftward and rightward direction.

A rear portion of the base plate 12 that occupies a substantially rear half region thereof is made as a flat portion 14. The flat portion 14 has a flat plate-like configuration and includes upper and lower surfaces that extend horizontally under the installation of the leg-sweep apparatus 10 on the vehicle. In a rear end portion of the flat portion 14, a plurality of insertion holes 16 (here, five insertion holes 16) are provided at regular intervals in the leftward and rightward direction and are formed through the thickness of the flat portion 14. A suitable fixing bolt or the like can be inserted into the each of insertion holes 16.

A front portion of the base plate 12 except for the flat portion 14 is made as a reinforcing portion 18 having a reinforcement structure. That is, a plurality of first reinforcing beads 20 (here, seven first reinforcing beads 20) and a plurality of second reinforcing beads 22 (here, six second reinforcing beads 22) are provided integrally on an intermediate region of the reinforcing portion 18 except both side-end regions thereof in the leftward and rightward direction, so that the reinforcing portion 18 has a sufficient reinforcement structure.

Figure 3:
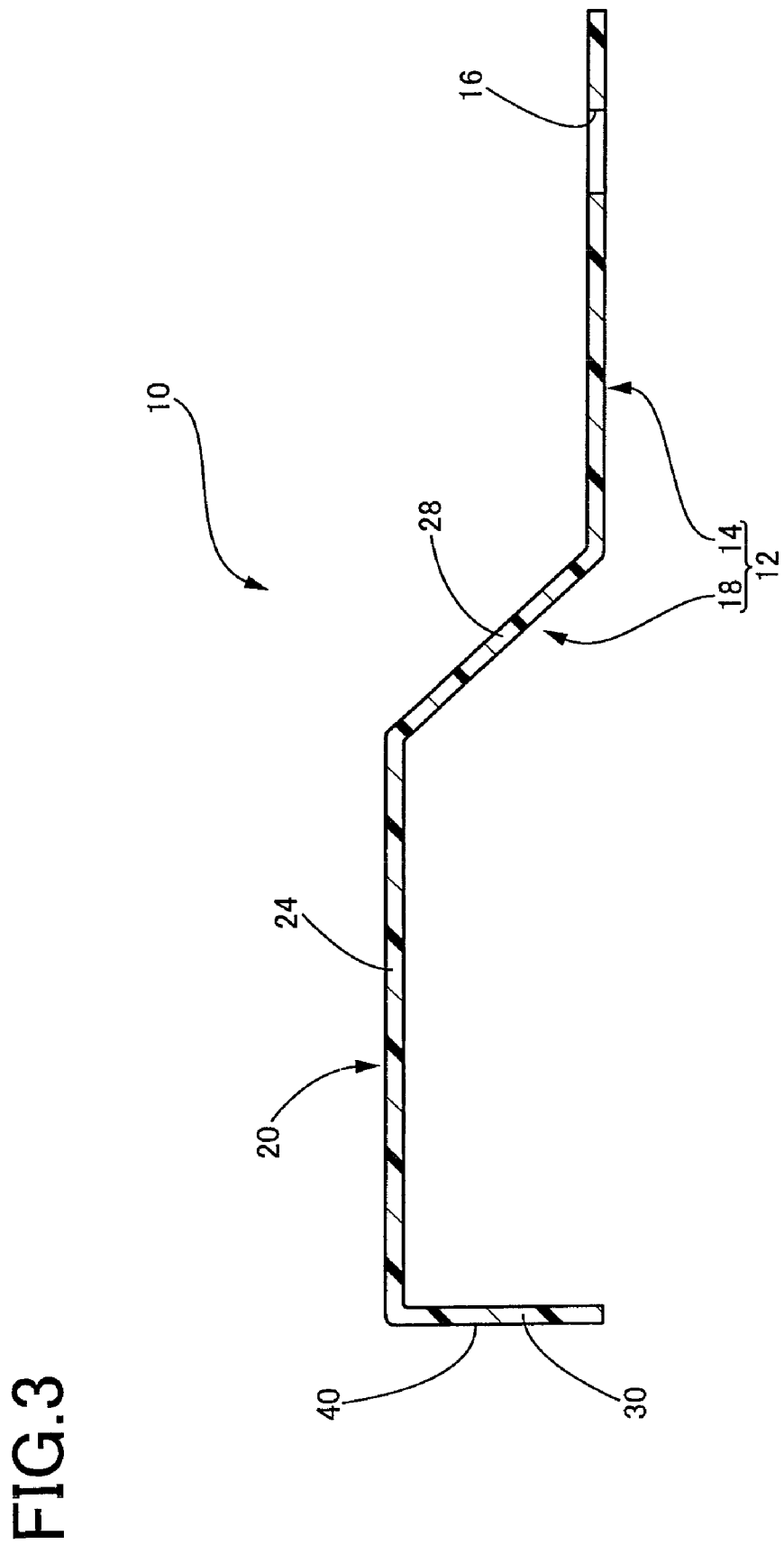
FIG. 3 is an enlarged explanatory cross sectional view taken along line 3-3 of FIG. 2.

More specifically, as shown in FIGS. 1 to 3, each of the first reinforcing beads 20 includes integrally an upper bottom wall 24 and two side walls 26, 26. The upper bottom wall 24 generally has a rectangular shape having a comparatively small width and extends straight in the frontward and backward direction. The upper bottom wall 24 is also disposed parallel to upper surfaces of side portions of the reinforcing portion 18 and an upper surface of the flat portion 14 which is flush with and continuous with the upper surfaces of each side portion of the reinforcing portion 18, such that the upper bottom wall 24 is located at a position higher by a predetermined distance than those upper surfaces. Each side wall 26 has a rectangular shape and is formed integrally with the corresponding upper bottom wall 24, so as to extend downward from respective widthwise opposite side edges of the same 24 with a predetermined height.

The first reinforcing bead 20 also has a rear descending wall 28 that extends from a rear end of the upper bottom wall 24 to a height position of the flat portion 14 while being inclined at a predetermined angle, and a front vertical wall 30 that vertically extends integrally downward from a front end of the upper bottom wall 24. The rear descending wall 28 and the front vertical wall 30 are connected integrally, at their widthwise opposite side-edges, to the rear-side edges of the respective side walls 26, 26.

Thus, each of the first reinforcing beads 20 has a generally rectangular box-like configuration extending upwardly and straightly in the frontward and backward direction with the constant height. In other words, each first reinforcing bead 20 has an angular U-shaped cross section which is taken along the plane perpendicular to the frontward and backward direction and which is open downward. A plurality of the first reinforcing beads 20 are provided integrally with a front end of the flat portion 14 at rear ends of the rear descending walls 28, and are arranged in parallel at regular intervals in the leftward and rightward direction in the middle section of the reinforcing portion 18 while the side walls 26 oppose each other.

Figure 4:
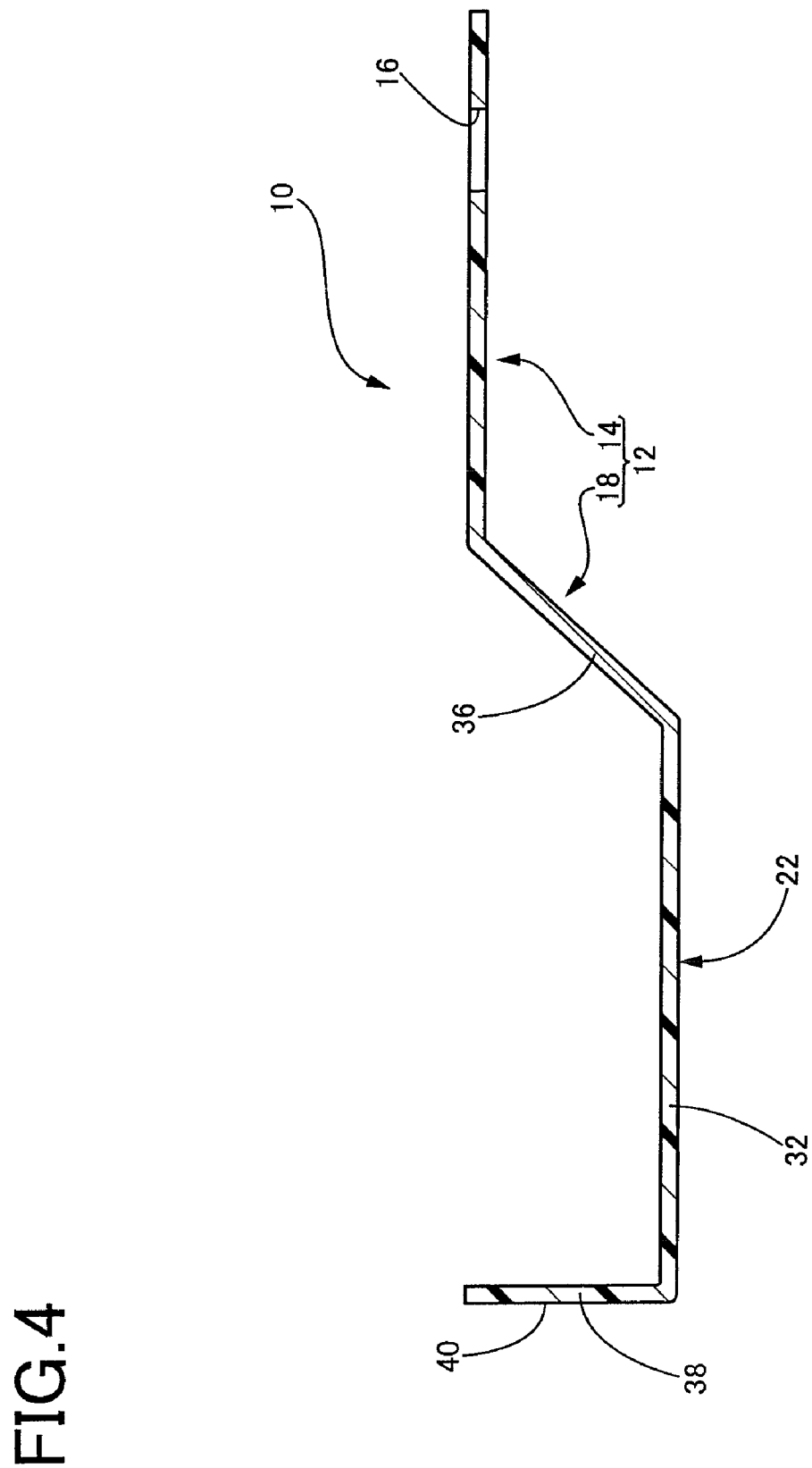
FIG. 4 is an enlarged explanatory cross sectional view taken along line 4-4 of FIG. 2.

As shown in FIGS. 1, 2, and 4, each of the second reinforcing beads 22 includes integrally a lower bottom wall 32 and two side walls 34, 34. The lower bottom wall 32 has a rectangular shape wider than the upper bottom wall 24 of the first reinforcing bead 20. The lower bottom wall 32 extends straight in the frontward and backward direction and is parallel to lower surfaces of the side portions of the reinforcing portion 18 and a lower surface of the flat portion 14 which is flush and continuous with the lower surfaces of each side portions of the reinforcing portion 18, such that the lower bottom wall 32 is located at a position lower by a predetermined distance than those lower surfaces. Each of the side walls 34 has a rectangular shape and is formed integrally with the corresponding lower bottom wall 32, so as to extend upward from respective widthwise opposite side edges of the same 32 with a predetermined height.

The second reinforcing bead 22 also has a rear ascending wall 36 that extends from a rear end of the lower bottom wall 32 to a height position of the flat portion 14 while being inclined at a predetermined angle, and a front vertical wall 38 vertically extending upward from a front end of the lower bottom wall 32. The rear ascending wall 36 and the front vertical wall 38 are connected integrally, at its widthwise opposite side-edges, to the rear-side edges of the respective side walls 34, 34.

Each of the second reinforcing beads 22 has a generally rectangular box-like configuration extending downwardly and straightly in the frontward and backward direction with the constant height. In other words, each second reinforcing bead 22 has an angular U-shaped cross section which is taken along the plane perpendicular to the frontward backward direction and which is open upward. The plurality of second reinforcing beads 22 are provided integrally with the front end of the flat portion 14 at rear ends of the rear ascending walls 36 and disposed between any adjacent two of the plurality of the first reinforcing beads 20 that are arranged at regular intervals in the leftward and rightward direction at the reinforcing portion 18.

The side walls 34 of each second reinforcing bead 22 are integrally connected to the corresponding one of the opposing side walls 26 of the adjacent first reinforcing beads 20. That is, each wall continuously extends in the vertical direction between the upper bottom wall 24 of the first reinforcing bead 20 and the lower bottom wall 32 of the second reinforcing bead 22, the first and the second reinforcing beads 20, 22 are adjacent alternately in the leftward and rightward direction, accordingly each side wall 26 and 34 constitute a connecting wall which interconnects the upper bottom wall 24 of the first reinforcing bead 20 and the lower bottom wall 32 of the second reinforcing bead 22. The side wall 26 of the first reinforcing bead 20 is formed by an upper part of the connecting wall, and the side wall 34 of the second reinforcing bead 22 is formed by a lower part of the connecting wall. Therefore, a plurality of first reinforcing beads 20 and a plurality of second reinforcing beads 22 are integrally provided in the reinforcing portion 18 in a manner such that they are alternately adjacent in the leftward and rightward direction.

In other words, in the leg-sweep apparatus 10 of the embodiment, the intermediate region of the reinforcing portion 18 has a rectangular corrugated shape that extends in the leftward and rightward direction and protrudes upward and downward from the upper and lower surfaces of the intermediate region with predetermined distance. Each of the upward protruding portions from intermediate region form the first reinforcing beads 20, and each of the downward protruding portions from the intermediate region forms the second reinforcing beads 22.

The plurality of the first reinforcing beads 20 and the plurality of the second reinforcing beads 22 are thus provided integrally on the reinforcing portion 18 of the base plate 12, thereby imparting a sufficient high degree of rigidity to the reinforcing portion 18, i.e., the front portion of the base plate 12. Accordingly, the reinforcing portion 18 has increased strength with respect to flexing deformation.

The first reinforcing beads 20 protrude upward, the second reinforcing beads 22 protrude downward, and the first and second reinforcing beads 20 and 22 are alternately provided in the leftward and rightward direction. Moreover, a protrusion height of the first reinforcing beads 20 from the upper surface of the reinforcing portion 18 (h1 in FIG. 2) is substantially equal to a protrusion height of the second reinforcing beads 22 from the lower surface of the reinforcing portion 18 (h2 in FIG. 2.) Therefore, the difference in rigidity between the upper and lower surfaces of the reinforcing portion 18 is more advantageously prevented or minimized.

Further, as shown in FIG. 1, front surfaces of the front vertical walls 30 of the first reinforcing beads 20 and front faces of the front vertical walls 38 of the second reinforcing beads 22 cooperate with one another to provide a single continuous surface in plan view. The thus formed continuous surface is made as curved convex surface that protrudes frontward corresponding to an inner surface of a bumper cover of a front bumper described below. The front surfaces of the front vertical walls 30, 38 which provide such a continuous curved surface in plan view defines, under installation of the leg-sweep apparatus 10 on the vehicle, an impact-input surface 40 to which is inputted an impact generated upon a collision of a pedestrian against the front face of the vehicle.

Figure 5:
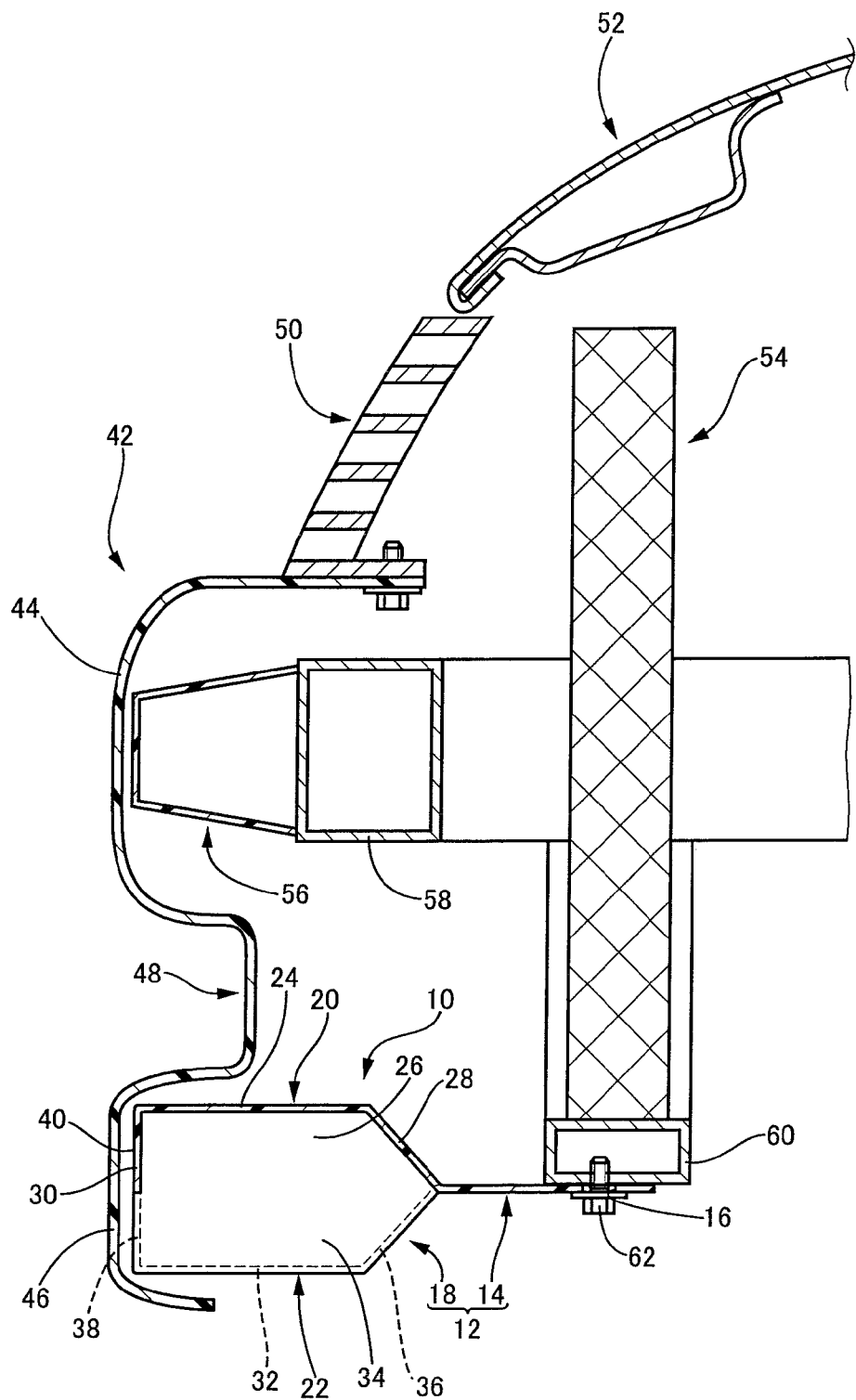
FIG. 5 is an explanatory view showing a state in which the pedestrian protection apparatus of FIG. 1 is installed on a vehicle.

The leg-sweep apparatus 10 having the above-described configuration is installed inside of a front bumper 42 provided at the front of the vehicle, for example, in a known manner as shown in FIG. 5.

The front bumper 42 with the leg-sweep apparatus 10 installed therein has a bumper cover 48 including an upper projecting portion 44 and a lower projecting portion 46 that protrude from the front face of the vehicle in a state in which the front bumper 42 is installed on the front face of the vehicle. Each of the upper and lower projecting portions 44, 46 has, in vertical cross section, a convex curved configuration protruding forward. The bumper cover 48 fixed by bolts or the like to a front grille 50, for instance, that constitutes a front face of the vehicle. In FIG. 5, the reference numerals 52, 54 denote a bonnet and a radiator, respectively.

A known impact or shock-absorbing member 56 whose rigidity is smaller than that of the leg-sweep apparatus 10 is disposed inside of the upper projecting portion 44 of the bumper cover 48 such that the impact-absorbing member 56 is fixedly interposed between the upper projecting portion 44 and a bumper reinforcement 58 as a rigid member.

The front ends of the first and second reinforcing beads 20 and 22 provided on the reinforcing portion 18 of the base plate 12 protrude from the front face of the vehicle into the lower projecting portion 46. The flat portion 14 of the base plate 12 extends horizontally in the frontward and backward direction, and an upper surface of the rear-side section of the flat portion 14 is held in contact with a lower surface of a radiator support 60. The radiator support 60 is fixedly provided at a front of the vehicle so as to extend in the vehicle width direction for supporting a radiator 54. Fixing bolts 62 are inserted in the corresponding insertion holes 16 provided at the rear-side end section of the flat portion 14 of the base plate 12 and screwed into the radiator support 60, whereby the flat portion 14 of the base plate 12 is fixed at its rear-side end section to the radiator support 60.

Thus, the leg-sweep apparatus 10 is disposed in the lower part of the front of the vehicle so as to extend horizontally in the frontward and backward direction, the first and second reinforcing beads 20, 22 in the reinforcing portion 18 of the base plate 12 and the flat portion 14 extend parallel to a horizontal plane which includes the input direction of the impact load to be inputted to the bumper cover 48 and such that the impact-input surface 40 is opposed to the inner surface of the lower projecting portion 46 of the bumper cover 48 so as to be orthogonal to the input direction of the impact load, the impact-input surface 40 being constituted by the front faces of the front vertical walls 30, 38 provided at the first and second reinforcing beads 20, 22, respectively.

Figure 6:
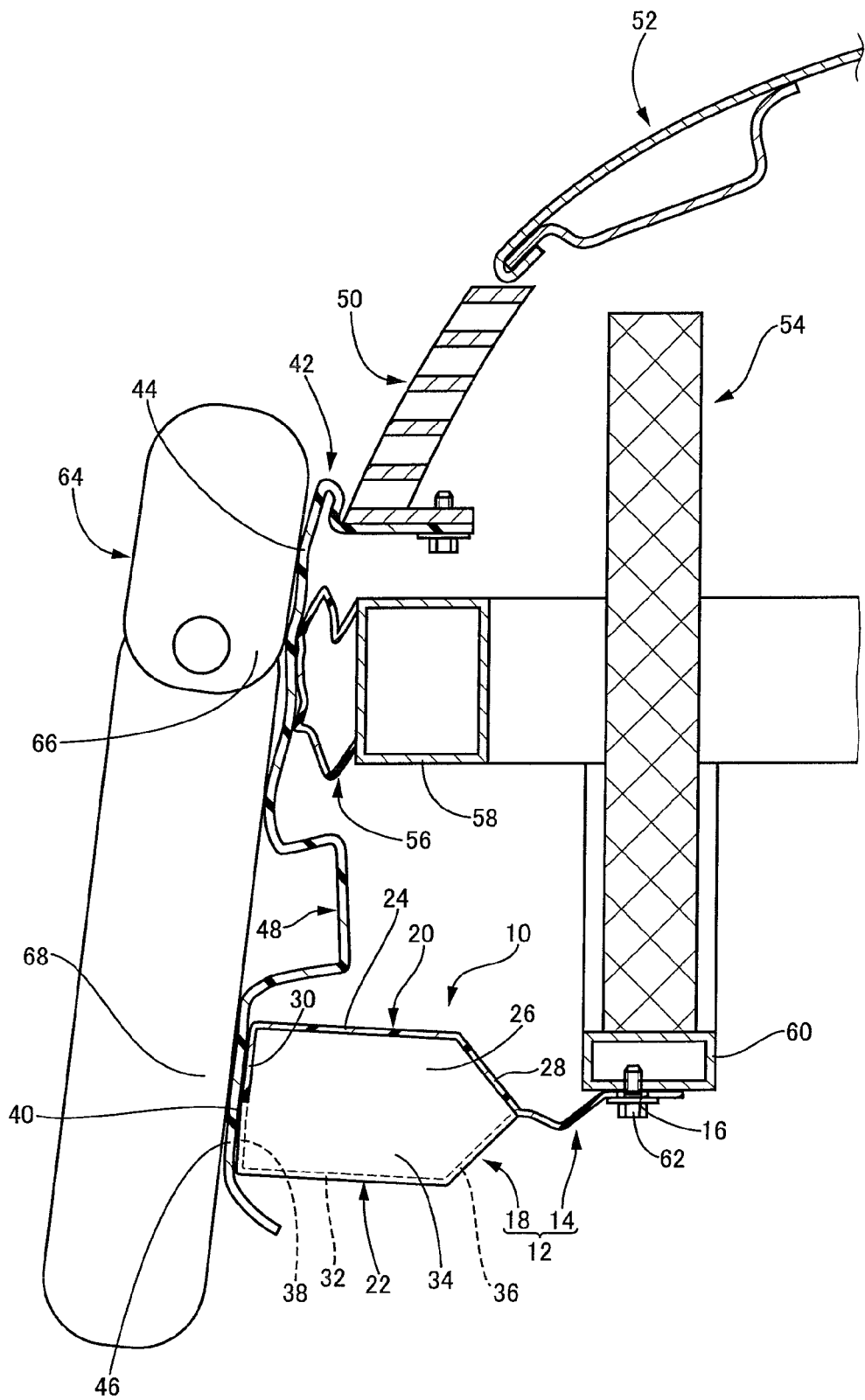
FIG. 6 is an explanatory view showing a deformation state of the pedestrian protection apparatus of FIG. 1 upon collision of a pedestrian with a front face of a vehicle on which the pedestrian protection apparatus is installed.

In the leg-sweep apparatus according to the present invention as shown in FIG. 6, when the bumper cover 48 of the front bumper 42 comes into contact with or collides with a leg portion 64 of a pedestrian, the upper projecting portion 44 and the lower projecting portion 46 of the bumper cover 48 respectively come into contact with the vicinity of a knee 66 and the vicinity of a shank 68 of the leg portion 64 of the pedestrian. In this case, since the shock-absorbing member 56 is made to have less rigidity than that of the leg-sweep apparatus 10, the shock-absorbing member 56 is deformed in a larger amount and more easily than the leg-sweep apparatus 10. Consequently, the lower projecting portion 46 of the bumper cover 48 protrudes more from the front face of the vehicle than the upper projecting portion 44, so that a counterforce with respect to the impact load generated in the leg-sweep apparatus by the collision of the leg portion 64 of the pedestrian against the bumper cover 48 acts on the vicinity of the shank 68 of the leg portion 64 of the pedestrian via the lower projecting portion 46 of the bumper cover 48. As a result, the vicinity of the shank 68 of the leg portion 64 of the pedestrian is swept or scooped up by the leg-sweep apparatus 10 so that the pedestrian falls down onto the bonnet 52 of the vehicle. Thus it is possible to limit bending of the knee 66 of the pedestrian in an undesired direction, and minimizes injury such as bone fracture. In this way, protection and safety of the pedestrian are assured effectively.

In the leg-sweep apparatus 10, in particular, a plurality of the first and second reinforcing beads 20, 22 integrally protrude upward and downward from the reinforcing portion 18 of the base plate 12 such as to have substantially equal protrusion height, as described above, and the reinforcing portion 18 has a sufficient rigidity without any difference in rigidity between the upper and lower sides thereof. Therefore, the arrangement is effective to prevent generation of a force that acts, upon inputting of the impact load, on the reinforcing portion 18 to lift the reinforcing portion 18 upward or lower the reinforcing portion 18 downward, thereby advantageously preventing easy deformation of the reinforcing portion 18 of the base plate 12.

The impact-input surface 40 of the reinforcing portion 18, which is opposed to the inner surface of the lower projecting portion 46 of the bumper cover 48 is disposed perpendicular to the horizontal plane which includes the input direction of the impact load. Therefore the impact load is inputted perpendicularly to the impact-input surface 40. The first and second reinforcing beads 20, 22 provided in the reinforcing portion 18 are angular U-shaped in cross section which take along the plane perpendicular to the frontward and backward direction so as to be open upward and downward, and which extend straightly in the frontward and backward direction with constant height. This also effectively prevents generation of a force that acts, upon inputting of the impact load, on the reinforcing portion 18 to lift the reinforcing portion 18 upward or lower the same 18 downward.

In the thus constructed leg-sweep apparatus 10, therefore, when the impact load is applied to the flat portion 14 via the reinforcing portion 18 in a substantially horizontal direction without suffering from easy flexing deformation of the flat portion 14 such that the reinforcing bead 18 is curled up or pushed down, so that the flat portion 14 can undergo buckling deformation with high reliability. Therefore, it is possible to effectively avoid occurrence of delay in the rise of the impact load in the load characteristics.

Accordingly, the impact load in the load characteristics can quickly rise, and a sufficient counterforce with respect to the impact load can be exhibited instantaneously. As a result, when the front bumper 42 collides with the leg portion 64 of the pedestrian, the leg portion 64 is quickly and reliably swept and satisfactorily protected with higher reliability.

The leg-sweep apparatus 10, under installation thereof at the front of the vehicle, is fixed only at the rear end of the flat portion 14 of the base plate 12 to the vehicle in a state in which the first and second reinforcing beads 20, 22 are not in contact with the radiator support 60, the bumper reinforcement 58, and other structural members. Thereby, this arrangement is effective to prevent that the structural members are damaged unnecessarily upon a light collision by an impact load inputted to the structural members of the vehicle via the first and second reinforcing beads 20, 22. Therefore, it is possible to minimize the cost of repairing the damage due to the light collision.

While the preferred embodiment of the present invention has been described in detail above, for illustrative purpose only, it is to be understood that the present invention is not limited to the details of the illustrated embodiment.

For example, the lengths, widths, and heights of each of the first reinforcing beads 20 and each of the second reinforcing beads 22 provided in the reinforcing portion 18 of the base plate 12 are not limited to those in the embodiment. That is, each of the first and each of the second reinforcing beads 20, 22 may be equal in length, width, and height, or may be different in any or all of the length, width, and height.

The numbers of first and second reinforcing beads 20, 22 on the reinforcing portion 18 of the base plate 12 are not particularly limited. Where the numbers of the reinforcing beads 20, 22 are increased by decreasing the widths of the each reinforcing beads 20, 22, the rigidity of the reinforcing portion 18 of the base plate 12 is accordingly increased. Therefore, the rigidity of the reinforcing portion 18 of the base plate 12 can be easily tuned by appropriately adjusting the number of the first and second reinforcing beads 20, 22.

The positions of the first and second reinforcing beads 20, 22 in the reinforcing portion 18 as the front portion of the base plate 12 are not particularly limited as long as the first and second reinforcing beads 20, 22 are alternately arranged in the width direction of the vehicle. That is, the reinforcing beads 20, 22 may be provided not only in the intermediate region of the reinforcing portion 18 as illustrated above, but also in the entire reinforcing portion 18.

The shapes of the first reinforcing beads 20 and the second reinforcing beads 22 may also be changed appropriately. For example, the cross sections of the first and second reinforcing beads 20, 22 taken along the plane perpendicular to the frontward and backward direction may be arcuate shape, curved, or polygonal which are open upward and downward. The above-indicated cross sectional shape of the first and second reinforcing beads 20, 22 may be made different or identical. Further, the shape of each of the first reinforcing beads 20 may be different from each other and the shape of each of the second reinforcing beads 22 may be different from each other.

While the entire leg-sweep apparatus 10 is formed of synthetic resin in the above-described embodiment, it may be formed of, for example, metal material such as aluminum or an aluminum alloy which is a relatively light weight and excellent in formability.

The installation structure of the pedestrian protection apparatus (the leg-sweep apparatus 10) on the lower part of the front of the vehicle is not particularly limited to that in the illustrated embodiment. That is, the portion of the vehicle to which the rear end of the base plate 12 is fixed and the fixing method may be changed variously.

While a counterforce with respect to an impact load generated in the leg-sweep apparatus 10 by a collision of the leg portion 64 of the pedestrian against the bumper cover 48 is arranged to act on the vicinity of the shank 68 of the leg portion 64 of the pedestrian via the lower projecting portion 46 of the bumper cover 48 in the above-described embodiment, the portion of the leg portion 64 of the pedestrian on which the counterforce acts may be appropriately altered depending on the installation position of the leg-sweep apparatus 10.

It is noted that, the present invention is advantageously applied not only to the pedestrian protection apparatus installed inside of the bumper fixed to the front of the automotive vehicle, but also to a pedestrian protection apparatus installed at the front of the vehicle independently of the bumper and to pedestrian protection apparatuses that are installed in various forms at the fronts of vehicles other than the automotive vehicle.

While the specific embodiment of the present invention has been described in detail above, for the illustrative purpose only, and the present invention can be embodied in other various manners. It is to be understood that the present invention is not limited to the foregoing description, but may be embodied with various changes, modifications, and improvements that may occur to those skilled in the art, without departing from the scope of the invention defined in the attached claims.

EXAMPLES

A representative example of the present invention will be described below in order to more clearly specify the characteristics of the invention. It should be noted that the present invention is not limited to the description of the example.

First, a leg-sweep apparatus having a configuration according to the present invention was prepared by carrying out injection molding using polypropylene, as shown in FIGS. 1 and 2. In this leg-sweep apparatus, the protrusion of first reinforcing beads from an upper surface of a reinforcing portion of a base plate and the protrusion of second reinforcing beads from a lower surface of the reinforcing portion has a height of 10 to 15 mm respectively, and the base plate has a thickness of 3 mm.

For comparison, apart from the invention apparatus indicated above, a leg-sweep apparatus having a configuration similar to that disclosed in the patent publication document 4 was prepared by carrying out injection molding using polypropylene. In this leg-sweep apparatus, only the same number of first reinforcing beads as those in the invention apparatus are provided at regular intervals in the leftward and rightward direction in a front portion (reinforcing portion) of a base plate, with no second reinforcing beads provided. The thus leg-sweep apparatus was prepared as a conventional apparatus. In the conventional apparatus, the protrusion height of the first reinforcing beads from an upper surface of the reinforcing portion of the base plate and the thickness of the base plate are made equal to those in the invention apparatus.

Figure 7:
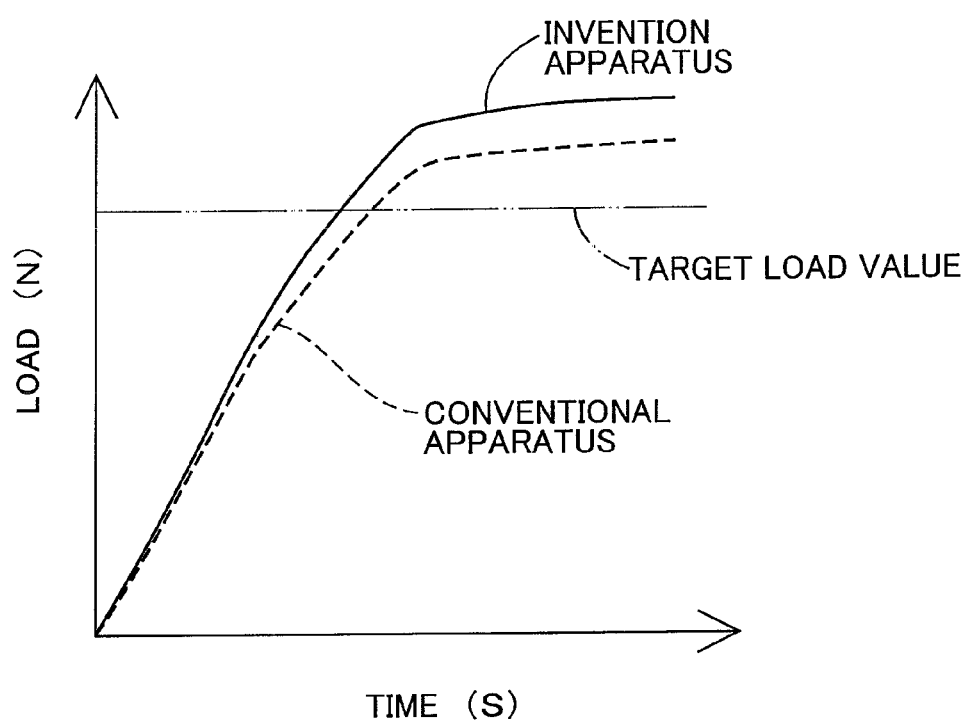
FIG. 7 is a graph showing changes in impact load with time obtained by conducting pedestrian collision tests for the pedestrian protection apparatus of present invention and the conventional pedestrian protection apparatus.

In the arrangement shown in FIG. 5, the two prepared leg-sweep apparatuses, the invention apparatus and the conventional apparatus, were actually installed on respective vehicles such that each apparatus was disposed inside of the bumper cover of the front bumper fixedly provided on the front face of each vehicle. Thereby, two types of test vehicles are prepared. Using the thus prepared two test vehicles, a pedestrian collision test was conducted on each of the test vehicles on the assumption that the front bumper of the test vehicle collided with a pedestrian for examining, according to a known manner, changes in the impact load with time inputted to each of the leg-sweep apparatuses upon collision of the pedestrian. The result is indicated in FIG. 7. The pedestrian collision test for each test vehicle was conducted such that a dummy having a weight of 13.4 kg was collided with the front of the front bumper of the each test vehicle at a speed of 40 km/h.

As apparent from FIG. 7, the impact load promptly reached a target value after the collision in the case using the invention apparatus, as compared with the case using the conventional apparatus. This clearly shows that a counterforce with respect to the impact load can be instantaneously and sufficiently ensured in the leg-sweep apparatus having the configuration according to the present invention.

What is claimed is:

1. A pedestrian protection apparatus for a vehicle, comprising a plate member which is disposed at a lower part of a front of the vehicle so as to extend in a frontward and backward direction of the vehicle, which includes a front portion and a rear portion, the apparatus being arranged to sweep a leg portion of a pedestrian that has collided with the front of the vehicle by contact of a front end of the plate member with the leg portion of the pedestrian, thereby protecting the leg portion of the pedestrian, wherein the front portion of the plate member includes a plurality of first reinforcing beads each protruding upward and extending in the frontward and backward direction of the vehicle and a plurality of second reinforcing beads each protruding downward and extending in the frontward and backward direction of the vehicle, the plurality of first reinforcing beads and the plurality of second reinforcing beads being provided integrally with the front portion so as to be alternately disposed in a width direction of the vehicle, wherein each of the plurality of first reinforcing beads is open downward and includes two side walls and an upper wall and each of the plurality of second reinforcing beads is open upward and includes two side walls and a lower wall, the side walls of first reinforcing beads being integrally connected to the corresponding side walls of adjacent second reinforcing beads, and wherein the rear portion of the plate member has a flat section extending in the frontward and backward direction of the vehicle and which is directly fixed at a rear end to the vehicle.

2. The pedestrian protection apparatus according to claim 1, wherein a protrusion height of the plurality of first reinforcing beads from an upper surface of the plate member is substantially equal to a protrusion height of the plurality of second reinforcing beads from a lower surface of the plate member.

3. The pedestrian protection apparatus according to claim 1, wherein each first reinforcing bead has an angular U-shaped cross section which is taken along a plane perpendicular to the frontward and backward direction of the vehicle, and each second reinforcing bead has an angular U-shaped cross section which is taken along a plane perpendicular to the frontward and backward direction of the vehicle.

4. The pedestrian protection apparatus according to claim 1, wherein each first reinforcing bead and each second reinforcing bead further includes, at a forward end thereof, a forward vertical wall which has a front surface extending in a vertical direction and which constitutes at least a part of the front end of the plate member.

5. The pedestrian protection apparatus according to claim 1, the plurality of first reinforcing beads and the plurality of second reinforcing beads have substantially the same rigidity.

6. The pedestrian protection apparatus according to claim 1, the flat section of the plate member is spaced from the first and second reinforcing beads.

7. A pedestrian protection apparatus for a vehicle which is disposed at a lower part of a front of the vehicle so as to extend in a frontward and backward direction of the vehicle, the apparatus including a front portion and a rear portion and being arranged to sweep a leg portion of a pedestrian that has collided with the front of the vehicle by contact of a front end of the front portion with the leg portion, thereby protecting the leg portion of the pedestrian, wherein the front portion includes a plurality of first reinforcing beads each protruding upward and extending in the frontward and backward direction of the vehicle and a plurality of second reinforcing beads each protruding downward and extending in the frontward and backward direction of the vehicle, the plurality of first reinforcing beads and the plurality of second reinforcing beads being provided integrally with the front portion so as to be alternately disposed in a width direction of the vehicle, and wherein the rear portion is formed of a flat plate extending in the frontward and backward direction of the vehicle and which is directly fixed at a rear end thereof to the vehicle, a front end of the rear portion being integrally connected to a rear end of the front portion.

8. The pedestrian protection apparatus according to claim 7, wherein the front portion terminates in a transverse direction at two lateral sides, and the flat plate as the rear portion extends to both lateral sides of the front portion.

9. The pedestrian protection apparatus according to claim 1, wherein the upper wall of the plurality of first reinforcing beads, and the lower wall of the plurality of second reinforcing beads are vertically spaced apart.

* * * * *